United States Patent [19]
Watts, Jr. et al.

[11] 4,086,568
[45] Apr. 25, 1978

[54] MODULAR I/O EQUIPMENT FOR CONTROLLING FIELD DEVICES DIRECTLY OR AS AN INTERFACE

[75] Inventors: Fred S. Watts, Jr., Denver; Lynn Loren Beecher, Arvada, both of Colo.

[73] Assignee: Public Service Company of Colorado, Denver, Colo.

[21] Appl. No.: 565,461

[22] Filed: Apr. 7, 1975

[51] Int. Cl.² .............................................. H04Q 9/00
[52] U.S. Cl. ............................... 340/147 R; 340/163; 340/147 LP
[58] Field of Search ............... 340/163, 147 R, 147 P, 340/147 SY, 147 LP; 179/15 AL

[56] References Cited
U.S. PATENT DOCUMENTS

| | | | |
|---|---|---|---|
| 3,593,290 | 7/1971 | Kerr | 179/15 AL |
| 3,641,326 | 2/1972 | Harte | 340/147 P |
| 3,688,262 | 8/1972 | Liquori | 340/147 P |
| 3,689,887 | 9/1972 | La Falce | 340/163 |
| 3,742,148 | 6/1973 | Ledeen | 179/15 AL |
| 3,919,461 | 11/1975 | Hunting | 340/147 LP |
| 3,950,728 | 4/1976 | Etchison | 340/147 LP |

*Primary Examiner*—Harold I. Pitts
*Attorney, Agent, or Firm*—John E. Reilly

[57] ABSTRACT

Signals for controlling any of a wide variety of field devices such as circuit breakers, generators, transformer connections and the like are produced from a common function module. The particular device or devices to be operated are selected on an exclusive basis by a control module dedicated for that purpose. The control module cooperates with the common function module to produce the desired control and/or monitoring of the associated field devices and prevents any other control module from operating when it is selected. Exclusive operation is effected by an interruptible serial connection of a power line between control modules. A multiplexing arrangement switches the pertinent measurement data associated with a selected operation into a display panel. The combined modules provide direct control of all field devices at a remote location but can also be controlled by a distant supervisory equipment. A common basic circuit configuration for the control modules permits tailoring the selected functions by relatively simple addition of circuit elements.

22 Claims, 10 Drawing Figures

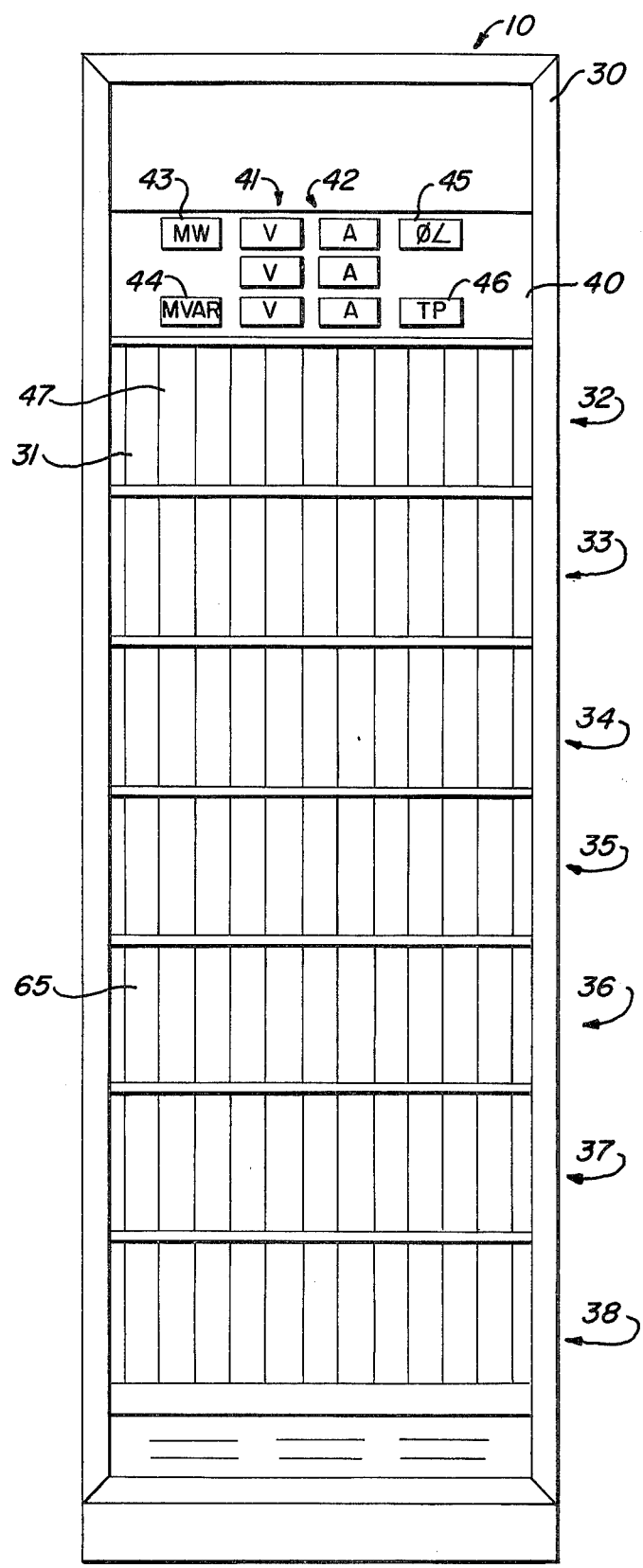
Fig_2

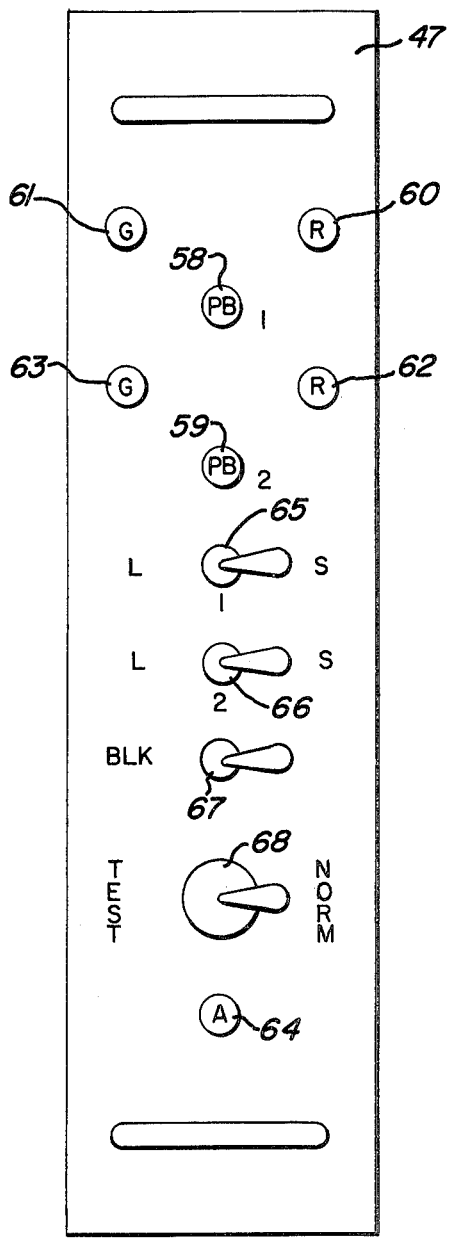
Fig_4
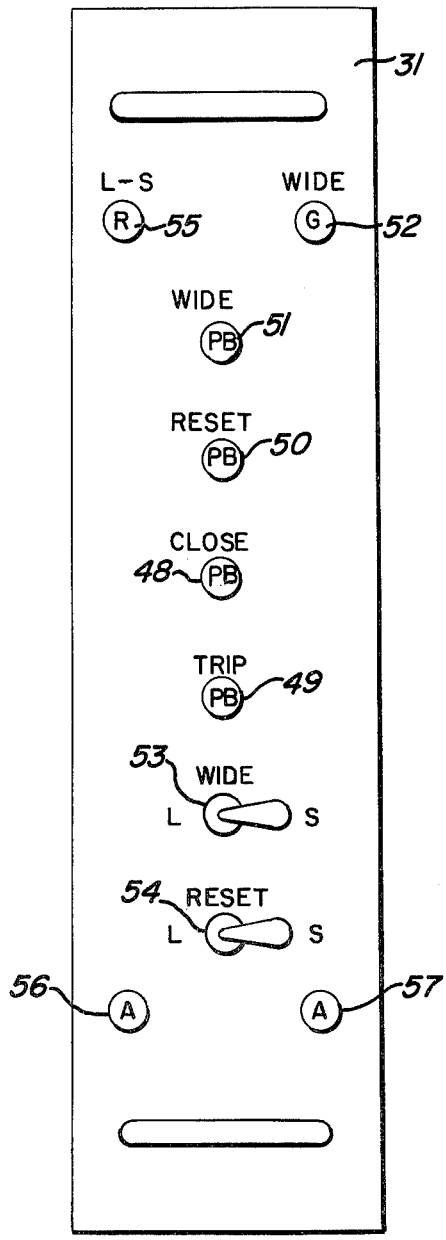
Fig_3

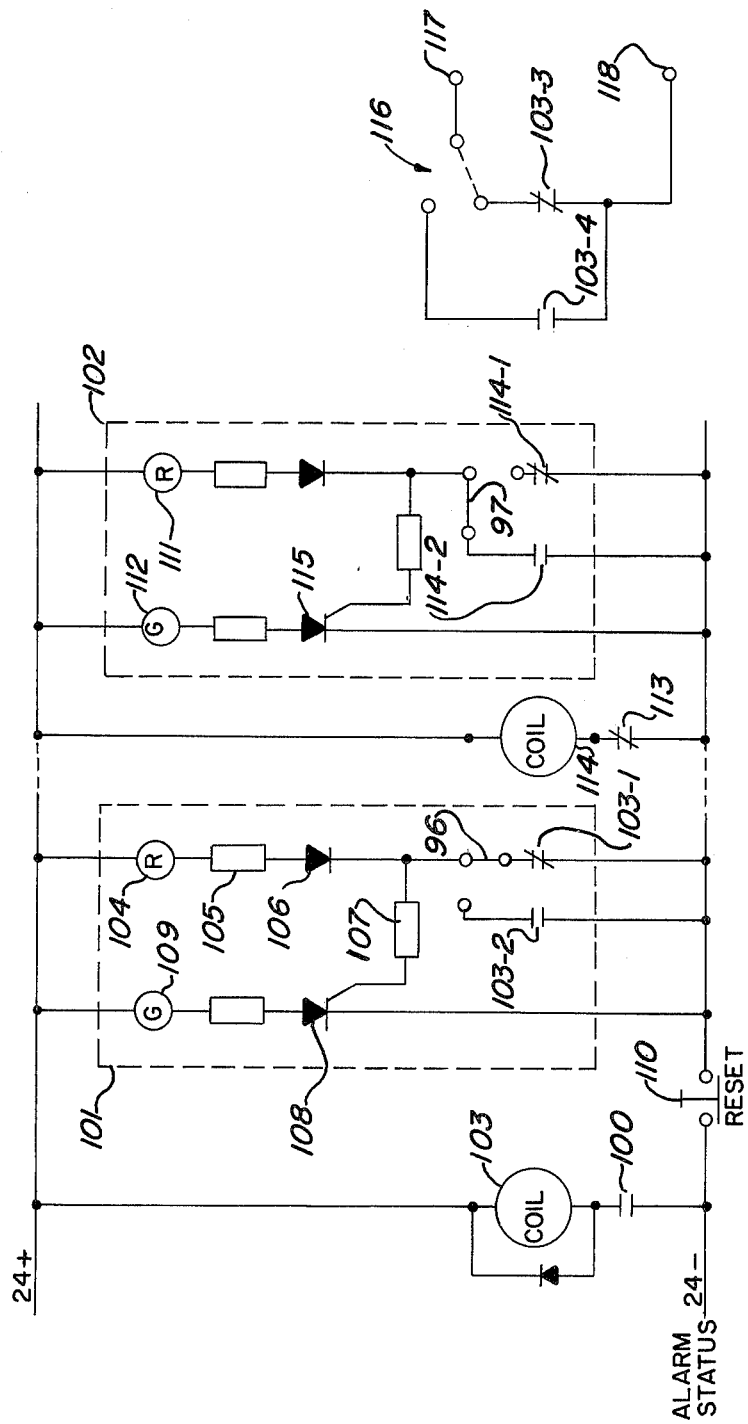

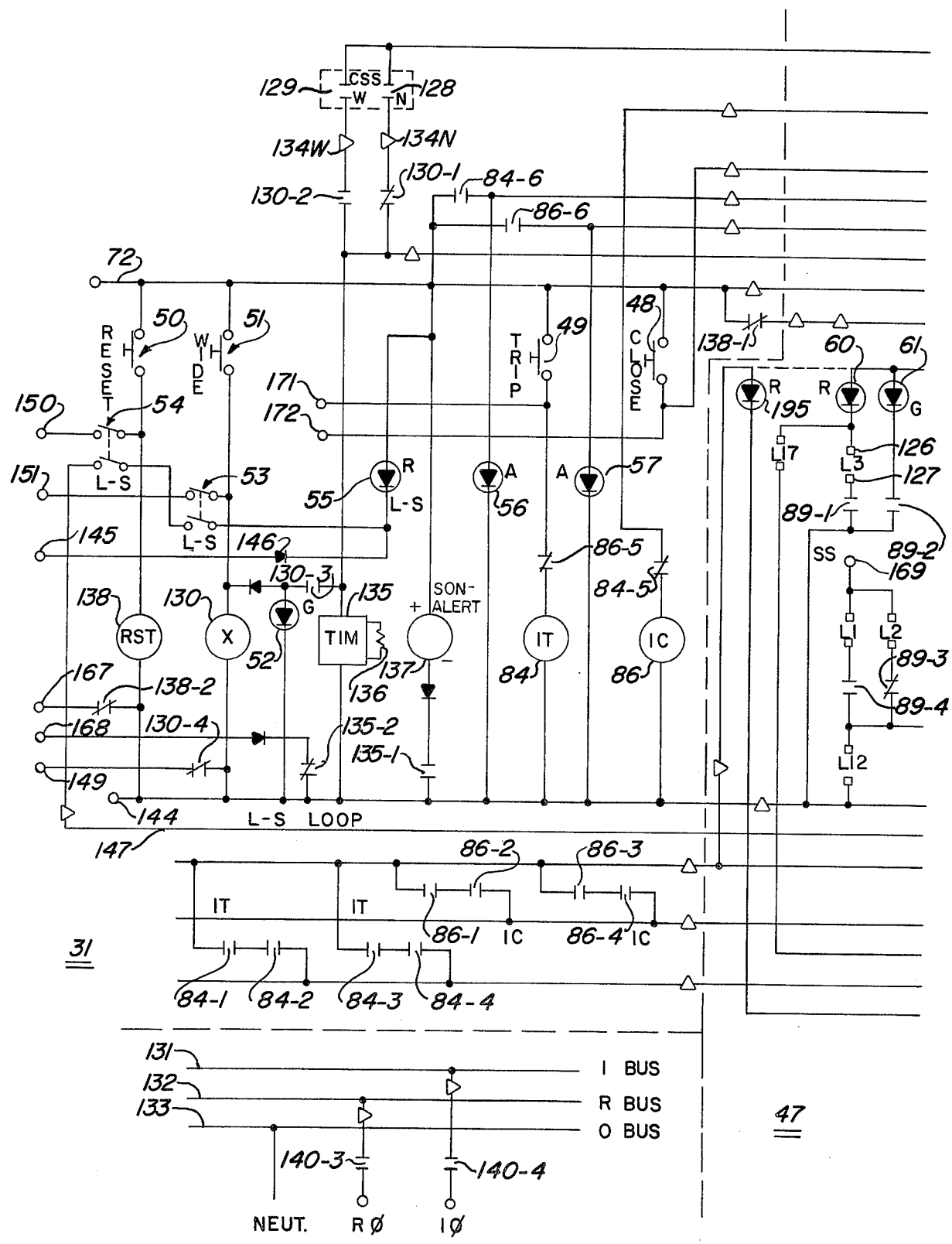
Fig_7A

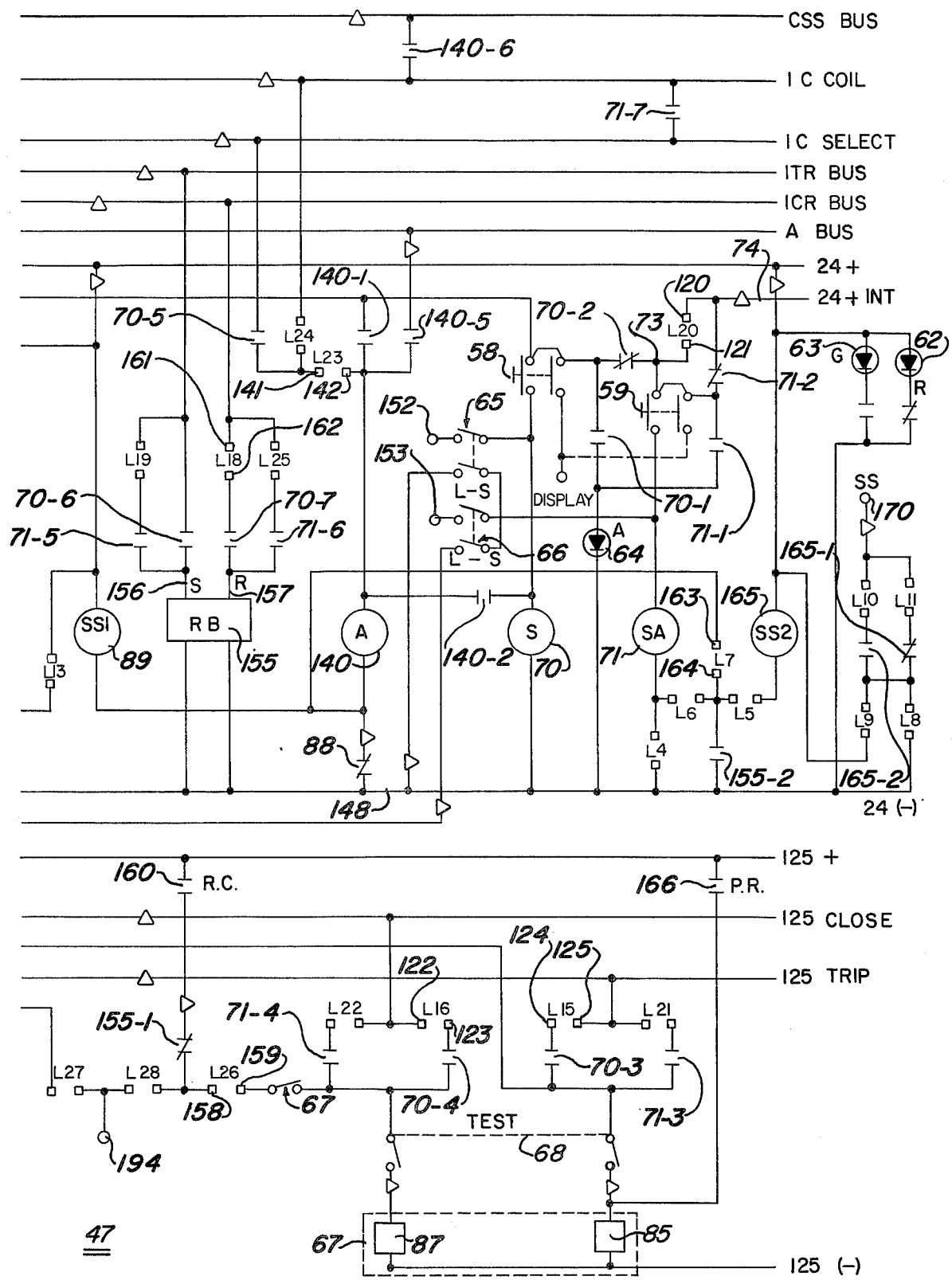
Fig_7B

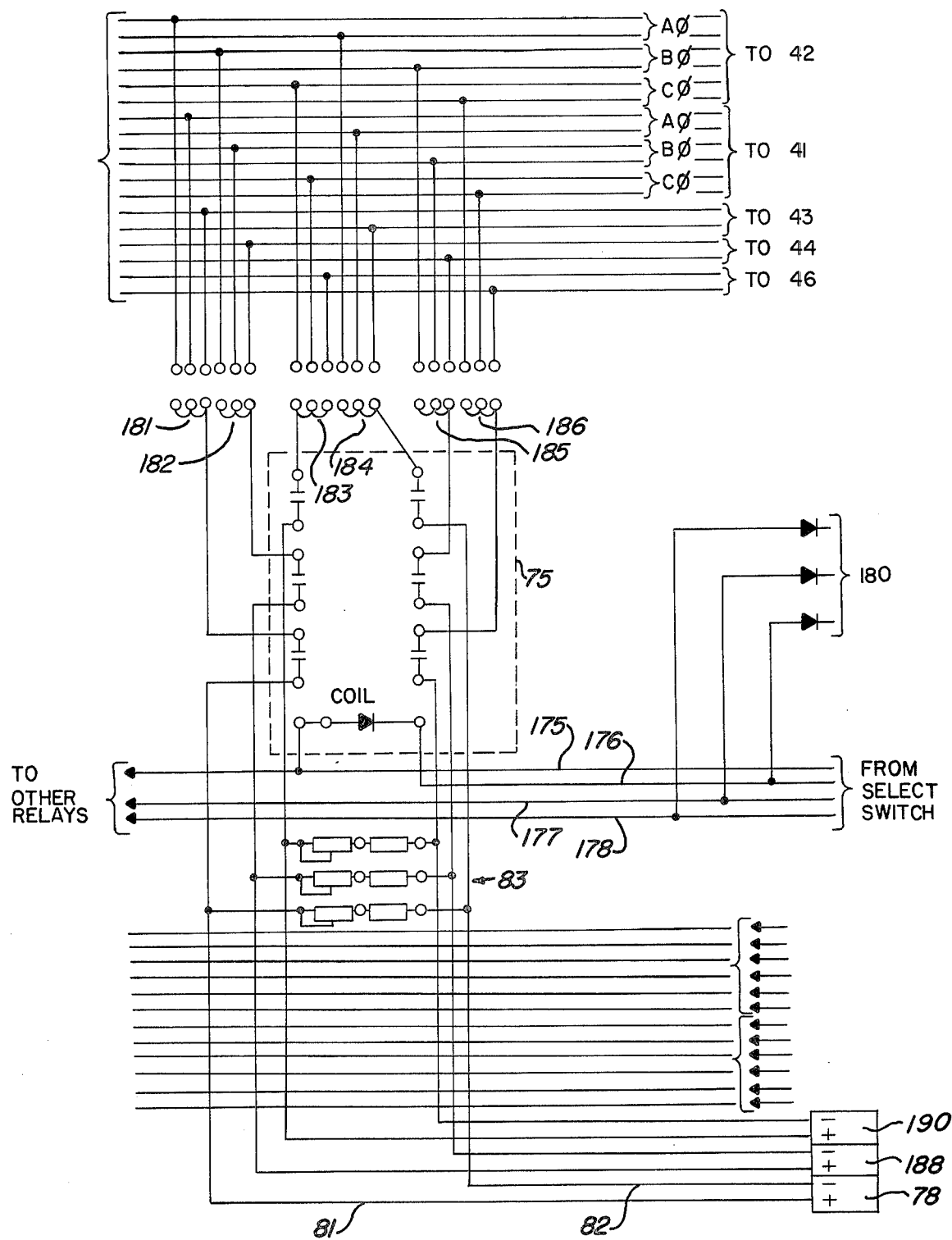
Fig_8

MODULAR I/O EQUIPMENT FOR CONTROLLING FIELD DEVICES DIRECTLY OR AS AN INTERFACE

BACKGROUND OF THE INVENTION

This invention relates to apparatus for controlling the operation and monitoring of a multiplicity of devices from either a remote station or a central supervisory station. More particularly, this invention relates to apparatus which can independently control a wide variety of field devices or control those devices as an interface in response to signals originated from a distant central location. As will be more readily apparent from the subsequent detailed description of a preferred embodiment, the present invention is especially useful for a standard interfacing arrangement to control the various switching operations associated with a powerutility operation including the switching of pertinent field elements such as circuit breakers, transformers, generators and the like as well as being useful for monitoring the performance and/or response of the associated field devices to the control stimulii signals and further monitoring the alarm conditions associated with such devices. The present invention is especially useful for providing a standard arrangement of circuitry which can be tailored to the particular requirements of a power utility substation with relative ease.

There are many instances wherein a multiplicity of remote devices require control from a central supervisory location. A variety of computer controlled data transmission systems for broadcasting command signals and receiving monitoring signals have been developed. For instance, U.S. Pat. No. 3,522,588 by Clarke et al illustrates a multiple remote station controlling arrangement wherein a central computer generates a broadcast of a remote device address and the control signal to be effected in parallel. Somewhat similar unique addressing configurations using digital transmissions are shown in Pat. Nos. 3,110,013 by Breese and 3,413,606 by Cichanowicz et al. It has also been suggested that these parallel generated supervisory command signals can be interpreted at an I/O interface so as to control various functions. Pat. No. 3,702,460 by Blose illustrates a CPU to remote processor communication system using a ground connection communication loop. The Blose patent suggests that the remote processors can in turn be used to control the utility functions for a geographic area. Others have suggested that the power distribution lines can be modulated in various ways for effecting such control communications between a central processor and the remote devices. Examples are U.S. Pat. No. 3,509,537 by Haberly and U.S. Pat. No. 3,689,886 by Durkee. It has also been suggested that the communicated signals over the power distribution line can be detected and used to control load switching as in U.S. Pat. No. 3,359,551 by Dennison and that the supervisory control system can be manually switched out for process control purposes as in U.S. Pat. No. 3,576,535 by Turner. Various systems have also been developed for providing communication priority based upon a serially connected loop. For instance, the article entitled "Multiplex Interface Selection Circuit" by L. T. O'Connor in the December, 1964 IBM technical Disclosure Bulletin (Vol. 7, No. 7, pages 592-593) shows a system for enabling or disabling all I/O devices downstream from a CPU in a serial loop and including logic circuitry for sensing the presence of an enabling signal on the loop.

The various prior art developments generally require tailored equipment for the transmission and interpretation of communications and do not permit intervention at a common I/O interface so that the controlled devices can be directly actuated free of the supervisory or central location. Further, the complexity of the prior art developments increases the fabrication costs and tends to decrease its long-term reliability which is a significant disadvantage for operations requiring a wide variety of control subsystems and a system that requires uninterrupted operation such as in power utilities. One attempt to provide a generally standard interface control apparatus is shown in U.S. Pat. No. 2,944,247 by Breese wherein an addressable substation includes a rotary address switch for determining its unique identity and includes a sequentially operable rotary switch for responding to supervisory control command signals so as to select the desired function to be performed.

Despite the advances in the supervisory control system art, there is a continuing need for a modular circuit system which permits relatively easy tailoring of a subsystem control configuration to the field devices which are to be operated and/or monitored thereby. Further, there is a continuing need for such a device which can be composed so that it can independently control the field devices or concurrently respond to the command signals from a supervisory location. This need is particularly evident in the power substation management industry wherein it is imperative that relatively economic modular approaches to interfacing equipment be employed so that they can be easily tailored to the variety of devices associated with the subsystem and in a manner which permits direct control of the subsystem or supervisory control thereof.

SUMMARY OF THE INVENTION

This invention is a modular interfacing configuration particularly useful for power substation control requirements. A basic function module is included in each interface which can produce any of several possible common command signals. A plurality of control file modules are included wherein these modules are constructed from common basic modular circuitry but each capable of uniquely directing pertinent control commands from the basic function module to one or more of the field devices to be controlled. The basic operating power for the control file modules are serially interconnected so that an upstream control file module when actuated will prevent and/or disable any selection of a downstream control file module. This feature is particularly advantageous since removal of operating power from downstream modules means that one control function must be completed or cancelled before another control function can be selected. Control confusion is prevented by allowing execution of only one control function at a time to the exclusion of the others. This further increases system security in that supervisory equipment can likewise only select one control function at a time. Each control file module can be tailored to perform a sepcific field device control function or functions, respond to the device itself as to indications of its successful operation, continuously monitor pertinent information concerning the field devices associated therewith and further include means for multiplex switching of significant measurement data from the field device into appropriate display panels. These display panels can be arranged to provide an immediate readable digital display of the quantities measured.

An object of this invention is to provide a modular system capable of being tailored to control a plurality of field devices from common basic circuitry.

A further object of this invention is to provide a single common function module for producing command signals as selected from a plurality of control modules each associated with one or more field devices to be operated.

A still further object of this invention is to provide a modular arrangement of circuitry which can be economically tailored to select and control any of a variety of functions.

Yet another object of this invention is to provide an arrangement for interfacing between a supervisory central location and a series of subsets of field devices in such a manner as to permit direct control of those devices at the interface or indirect control from the supervisory location.

A still further object of this invention is to provide a modular control system for a plurality of field devices which permits concurrent selection of unique control commands for those devices and switching of multiplex points so as to display pertinent measurement data relating to the operation being controlled.

A further object of this invention is to provide a modular interface arrangement capable of being tailored to particular power distribution substation requirements while still accommodating existing supervisory equipment controls.

The foregoing and other objects, advantages and features of the present invention will be more apparent in view of the following detailed description of an exemplary preferred embodiment.

BRIEF DESCRIPTION OF THE DRAWINGS

FIG. 2 shows an exemplary cabinet panel arrangement of the modules and displays associated with the preferred embodiment.

FIGS. 3 and 4 illustrate typical front panel switch and display configurations useful in the preferred embodiment.

FIGS. 6A and 6B are schematic circuit diagrams of two types of alarm status monitoring circuits.

FIGS. 7A and 7B when taken together present a more detailed circuit diagram of the modular arrangement of a function module and one exemplary control file module as interrelated to a circuit breaker controller in accordance with the present invention; and FIG. 8 shows the detail of the multiplexing arrangement for switching pertinent measurement data associated with an operation into display devices.

DETAILED DESCRIPTION OF THE PREFERRED EMBODIMENT

Figure 1:
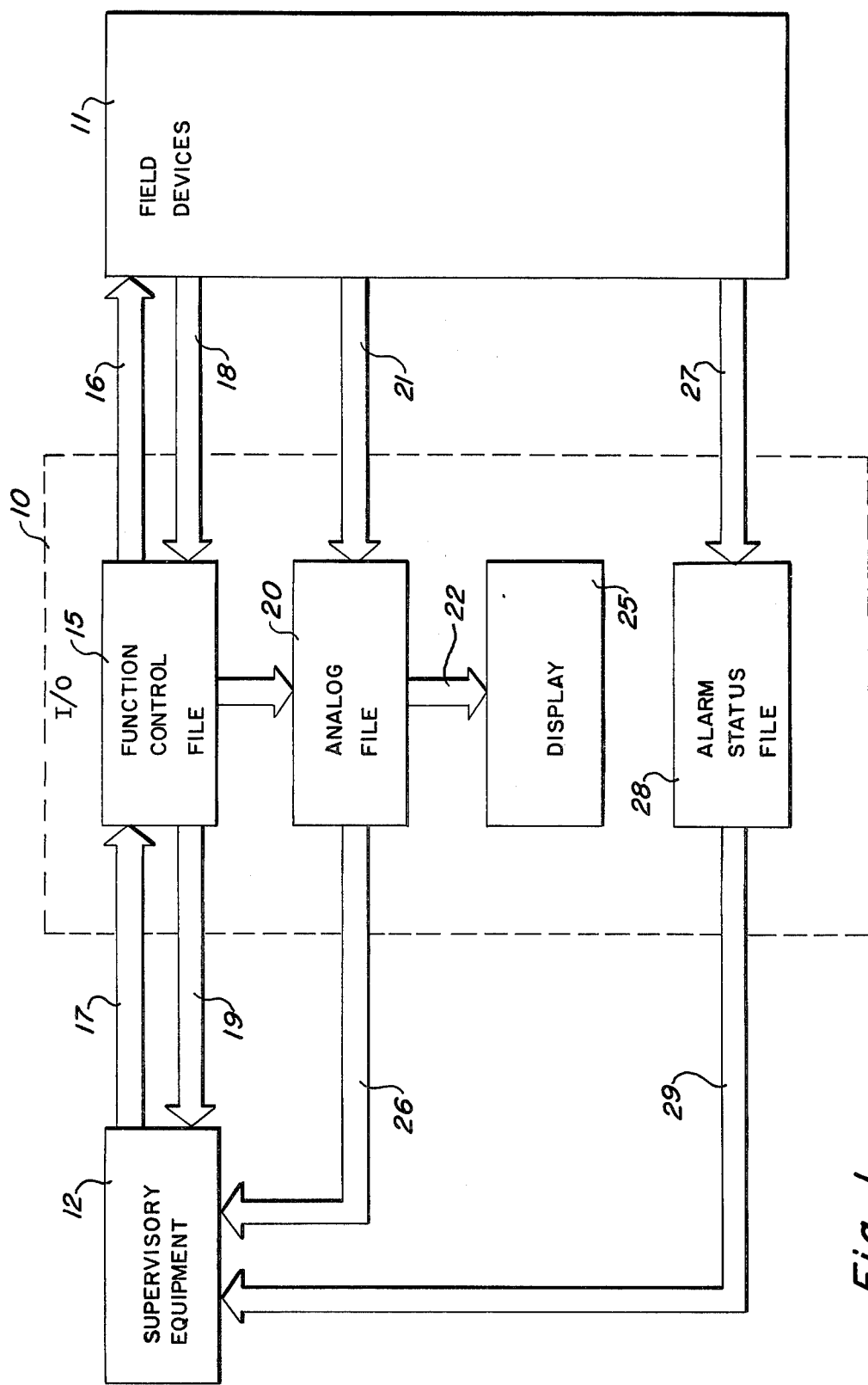
FIG. 1 is a general block diagram illustrating the interrelationship between the preferred embodiment and existing supervisory equipment and field devices.

The exemplary preferred embodiment will be described in terms of apparatus for either directly controlling or providing a controllable interface for power substation operations. FIG. 1 is a general system block diagram showing the interfacing input/output or I/O apparatus 10 which can either directly control field devices 11 or permit supervisory equipment 12 to effect control of devices 11. For power substation control applications, field devices 11 typically might include a plurality of power circuit breakers, tap changing transformers, synchronous switching devices, turbine generators, transformers and the like. The present invention is particularly advantageous in implementation for such power substation interfacing in that it can accommodate a relatively wide variety of devices 11 with a substantially standard apparatus as will be more fully appreciated from the detailed description below.

Function/control file 15 can be controlled to locally generate selected control output signals on output lines 16 to perform the desired function by one or more selected subsets of the field devices 11. That is, the selected control signals can either be originate locally from modules 15 or, if an appropriate enabling switch is set in modules 15, these control signals can likewise originate from the supervisory equipement 12 and be passed through modules 15 from control inputs 17 and thence into the appropriately selected device 11. For instance, appropriate signals can be produced on one or more of selected lines in multi-line cable 16 to raise or lower the watts or vars being produced, starting and stopping of turbines, turbine speed control signals, power circuit breaker closing or tripping signals, initiation of automatic synchronous circuit breaker closing, tap raising or lowering changes for variable tap transformers, recloser blocking for automatic or non-automatic closing apparatus and the like. By sensors directly associated with the selected devices, control status input signals can be returned on appropriate lines of input cable 18 to indicate that the selected operation has been performed. These status input response signals can be both directly displayed in I/O module 15 and can also be passed on to the supervisory equipment 12 over control status input cable 19.

A plurality of analog file modules 20 are likewise included within I/O apparatus 10. The various field devices 11 produce a multiplicity of operating condition and environment indicating analog signals as inputs over cable 21 into analog modules 20. The signals for analog input 21 are produced by appropriate well-known transducer devices and can include indications of various pertinent data. Some of this analog data can be selectably switched over cable 22 into either digital or analog display devices in display apparatus 25. Thus display module 25 includes a variety of display devices. In addition, files 15 and 28 can include other displays such as continuous lamp displays for indicating the closed or tripped status of circuit breakers. Further, as will be readily apparent from the later description, display modules 25 can include a series of digital panel meters to provide a directly readable digital indication of the operating conditions of selected field devices 11. For instance, if field devices 11 are controlling a plurality of power line switching apparatus, the transducers in association with devices 11 can provide indications at input 21 of the watts, vars, volts and amperes being produced by each phase of the output connections. By appropriate switch selections, display modules 25 can provide an immediate indication of all of these measurements.

Further, in synchronous circuit breaker closing wherein two powered buses are being coupled, input 21 can be produced by a phase angle transducer which indicates the difference of phase between the two lines being switched and this phase signal difference can be indicated as a degree signal. Other information which can be of use for direct digital display might include a tap position indicating signal. The other analog signals being produced over input 21 can be used to provide a direct display or analog level and can indicate such environmental operating conditions as the speed of a turbine generator, the ambient temperature of any of the devices 11 or their environment, gas pressure associated with various devices 11, distillate or fuel pressure and the like. These signals can likewise be transmitted to the supervisory equipment over output cable 26.

There are a series of other conditions which are sensed in association with field devices 11 which require relatively prompt attention. Thus, input cable 27 can include signals reflecting such abnormal conditions as transformer hot spots, differential relaying wherein relays on both the input and the output of a transformer have been tripped so as to totally isolate it, low air pressure for a circuit breaker, loss of tripping DC for a circuit breaker, low oil level in a transformer tank or tap charger mechanism, loss of relay AC and the like. The alarm status file module 28 includes appropriate apparatus for responding to the abnormal condition signals at input 27 such as by lamp indicators, audio indicators or like annunciation. Further, these alarm status indicators can be passed on to the supervisory equipment over output cable 29.

FIG. 2 illustrates a typical cabinet arrangement 30 for retaining all of the elements associated with an I/O module configuration 10. As will be understood from the following description, a single function module 31 is all that is required for controlling a wide variety of field devices. In a typical environment, all of the modules indicated for rows 32-34 except function module 31 might include control file modules while row 35 might contain all alarm status file modules with rows 36-38 containing analog file modules. Although various ones of the modules in rows 32-38 will contain lamp indicators, the apparatus further includes a display panel 40 which can include digital readout displays for various measurements associated with the field devices which need to be immediately available. For instance, three voltage ("V") displays in column 41 can indicate the potential associated with the three phases of a power bus, the three ammeters ("A") in column 42 can indicate the current flowing through each of three line phases and indicator 43 can display the megawatts of power being handled by the three line phases with display 44 indicating the megarvars associated with the three line phases.

Further, it is necessary to provide some indication of the phase angle difference between two powered transmission lines when a connection is to be established therebetween. Thus phase angle display 45 is included for this purpose and it can be further supplemented if desired by utilizing special switching circuits to select an appropriate pair of the voltage displays 41. The final display shown includes tap position display 46 to indicate the actual location of a transformer tap. It should be noted that there are a wide variety of commercially available devices well suited for direct application as displays 41-46 on panel 40. For instance, the AD2010 latched digital LED display from Analog Devices of Norwood, Massachusetts can be used for these displays. This typical display includes analog to digital conversion circuitry and latched buffering for its LED display so that it can be either directly energized by digital input signals or sample analog input signals and provide digital displays of the conversion results.

It will be understood that any mix of function, control, status and analog modules can be incorporated in the standard framework of a cabinet such as 30 other than that shown as can be different arrangements of display devices for display panel 40. Further, cabinet 30 typically would include power circuitry for providing appropriate levels necessary for powering the various modules and field devices controlled and monitored thereby. For instance, cabinet 30 can include power supply devices for producing 5 volts DC, 24 volts DC and 125 volts DC with appropriate automatic throw-over apparatus for switching between a primary power supply and a backup power supply where such redundancy is needed for reliability of operation. Depending upon the substation requirements, many of the panels for rows 32-38 might be blank or, for a more complex system, additional racks 30 of I/O equipment might be included.

FIGS. 3 and 4 illustrate a potential external appearance for a function module 31 and a control file module 47. The interconnecting circuitry associated with the elements of both modules 31 and 47 will be described in detail later for FIGS. 5 and 7. Since a typical common function to be controlled for many of the control modules is the closing and tripping of power circuit breakers, pushbuttons 48 and 49 are included on the function module 31 to permit selection of those particular operations. Further, the reset of a selection at a control module such as 47 can be effected through pushbutton 50. Still further, there are occasions when a relatively wide phase angle difference can be tolerated in synchronous switching between power lines. That is, the switching between powered transmission lines ideally is performed when there is zero phase difference between those lines but, as a practical matter, switching when the phase difference is ten degrees or less is generally acceptable. There are some exceptions such as for switching generators on to power lines in which event the desired tolerance is usually three degrees or less. Conversely, there are occasions such as when long lines are being switched wherein a phase difference of as much as thirty degrees can be tolerated, this being referred to as a "wide" synchronization. Accordingly, pushbutton 51 is included on the front panel of function module 31 to permit selection of automatic wide synchronous switching and lamp 52 indicates when this wide selection has been actuated.

As will be discussed, there are many controls and functions which can be controlled both locally ("L") and by the supervisory equipment ("S") or which can be switched so that they can be controlled locally only. Thus switches 53 and 54 are included on the front portion of the panel for module 31 to select either local or supervisory control through positioning these switches in the "S" position which permits local and supervisory control or by local control only when they are in the "L" position. Further, indicator lamp 55 is included on the panel for module 31 and is illuminated when all L-S switches are in the "S" state. The remaining elements on the front panel of module 31 are amber (A) lamps 56 and 57, the former being illuminated when the trip function relay is operated and the latter being illuminated when the close function relay is operated.

FIG. 4 illustrates a typical control function module front panel which includes all possible combinations of elements contemplated in the typical example being described for this preferred embodiment. Pushbutton 58 provides a primary device selection function and pushbutton 59 provides a secondary selection function for this particular module. Display lamps 60 and 61 provide an indication of the results of actuating pushbutton 58 in conjunction with either 48 or 49 on module 31 whereas display lamps 62 and 63 provide similar indications for operations relative to pushbutton 59. Amber lamp 64 is employed to provide absolute verification of internal circuit operation in response to actuation of pushbutton 58 or 59. Toggle switches 65 and 66 permit appropriate supervisory enabling or blocking relative to the functions to be ultimately controlled by operation of pushbuttons 58 and 59, respectively. Switch 67 permits local blocking of the remote recloser whereas switch 68 permits testing of control and/or supervisory points without actually operating the field device. It will be understood that various of the lamps, pushbuttons and switches actually shown on control file module 47 may be omitted completely in many cases.

Figure 5:
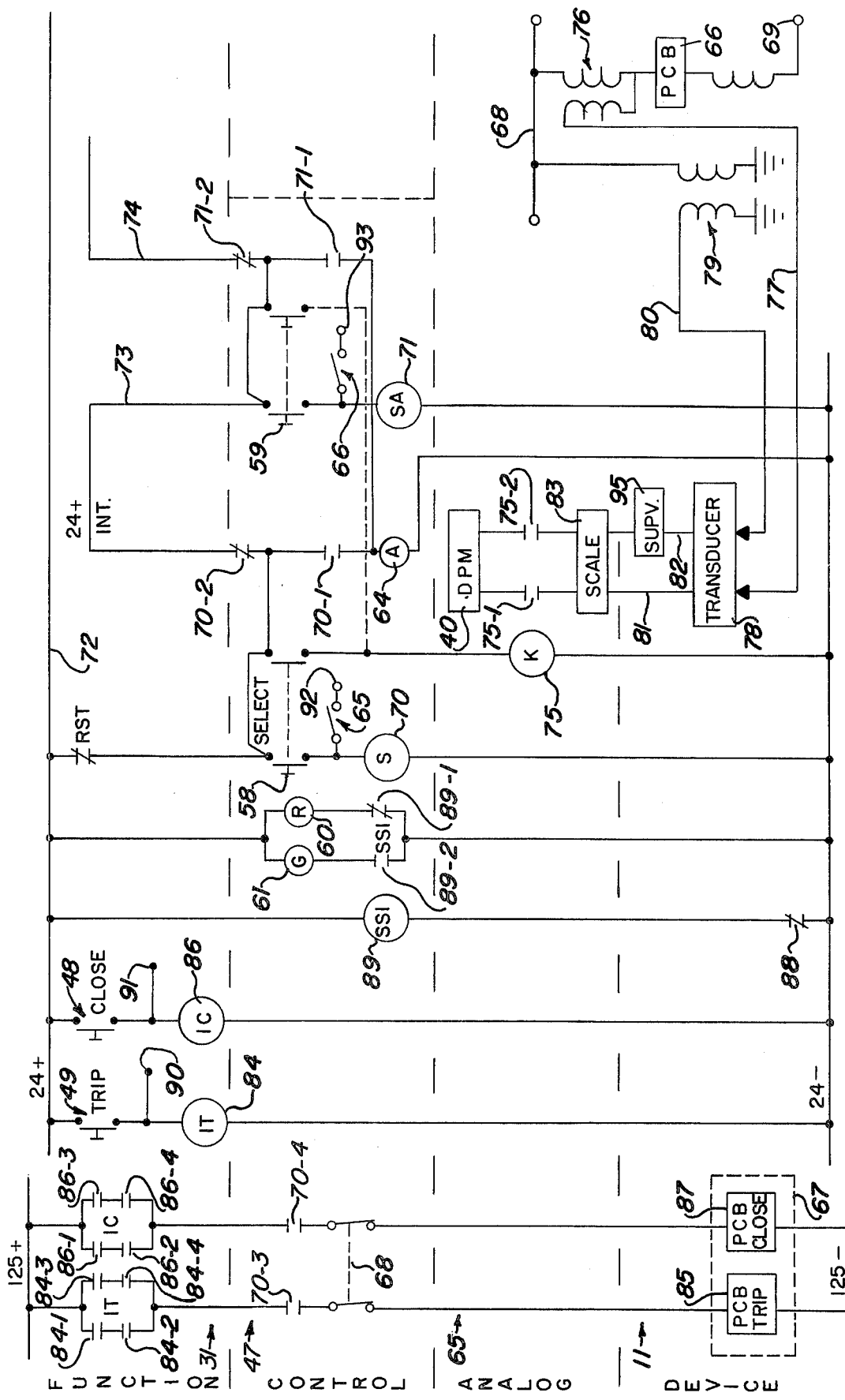
FIG. 5 is a general schematic circuit diagram illustrating some of the elements and operating interrelationships for the modules in accordance with the preferred embodiment.

FIG. 5 schematically illustrates basic circuit interrelationships which could be involved in effecting the various selection and control operations associated with the controls and switches as generally illustrated in FIGS. 1-4. That is, FIG. 5 shows the circuit interconnections and operating interrelationships for certain exemplary operations, the detailed operations and interrelationships for the control of the functions mentioned previously being shown in expanded form in the composite of FIGS. 7A and 7B. The FIG. 5 environment shows a common function module 31, one exemplary control module 47, a typically associated analog file module 65 and a subset of the field devices 11 which in this instance is illustrated as a single power circuit breaker 66 which is controlled by the coils shown generally at 67. In this example, the control file module 47 is intended for the purpose of controlling the opening and closing of power circuit breaker 66 so as to connect or disconnect power from main bus 68 to output terminal 69. It is to be understood that a typical power utility operation would involve multiple phase line connections whereas only a single phase main bus 68 and output terminal 69 are shown for purposes of simplifying the illustration.

It should be further noted that common reference numerals are applied as between FIGS. 5 and FIGS. 1-4 wherever reasonable to do so. Thus the control file module 47 as illustrated includes two control function selection switches 58 and 59. Pushbutton 58 is arranged to energize selector relay coil 70 when closed whereas pushbutton 59 energizes relay coil 71. Power bus 72 is coupled through the normally closed reset contact RST such that, when pushbutton 58 is closed, current flowing through relay coil 70 will close normally open contact 70-1 and open normally closed contact 70-2 thereby removing power from line 73 and deactivating possible selection via pushbutton 59. IF the operation being controlled is a synchronized power circuit breaker closing, selection pushbutton 58 actuates an additional relay (not shown in FIG. 5) which seals or holds both itself and the selection relay. It will be retained in the closed position once actuated until the reset relay has been actuated thereby releasing the RST contacts. Note further that selection of pushbutton 59 without selection of pushbutton 58 will effect closing of normally open contact 71-1 and opening of normally closed 71-2 thereby removing actuating power from output line 74 which is connected to provide the input power to the next control file module. Accordingly, one and only one module can be selected and all downstream modules are thus deactuated as are downstream pushbuttons such as 59 in the event of selection of pushbutton 58.

The actuation of selection pushbutton 58 applies operating power to display control relay 75 thus closing contacts 75-1 and 75-2. Current transformers 76 in series with breaker 66 provide inputs 77 to a transducer 78 while potential transformers 79 couple potentials over line 80 into transducer 78. Transducer 78 is any of a well known variety of commercially available transducers which converts the input AC currents and/or potentials to a proportional output representing watts, vars, voltage, current or the like. This output is produced at terminals 81 and 82 and passed through a scaling circuit or divider circuit 83 before being introduced through contact 75-1 and 75-2 into the appropriately selected meter on the digital panel meter array 40. With both voltage and current coupled into transducer 78 via lines 77 and 80, the output at 81 and 82 can typically represent watts or vars as well as current or voltage.

In some instances, more than one measurement is to be displayed in association with operation of a particular pushbutton such as 58. Under those circumstances, a separate transducer for each measurement is typically included as are additional coupling contact points such as 75-1 and 75-2 for connecting the output of those transducers into separate display meters on panel 40. Thus the operation of a pushbutton such as 58 which effects switching of three power circuit breakers for switching a three-phase power line might typically include separate transducers and display coupling arrangements for the voltage and current of each phase as well as the total real and reactive power being transferred.

FIG. 5 illustrates the coupling of power to the control relay coils of the circuit breaker 66 as indicated in block 67. That is, closing of pushbutton 58 results in the selection of relay 70 and thus closure of normally open contacts 70-3 and 70-4. Actuation of pushbutton 58 followed by actuation of trip pushbutton 49 on the panel of function module 31 results in actuation of trip relay 84 thereby closing normally open contacts 84-1 through 84-4, these contacts being shown in a serial/parallel configuration for current handling and reliability. Since contacts 70-3 are closed at that moment, the power circuit breaker trip coil 85 is thus actuated. Note that test/normal switch 68 is shown in the normal or closed position, opening of switch 68 permitting testing of the operation of the circuitry up to the actual energization interface for control coils 67. An operation similar to the trip operation is performed by actuating close pushbutton 48 which selects the close coil relay 86 thus transferring power through normally open IC relay contacts 86-1 to 86-4 thereby actuating the power circuit breaker close coil 87.

Display lamps 60 and 61 are intended to indicate the status of the particular associated field device 11. In the example shown in FIG. 5, a sensor associated with the field device 11 controls a relay which in turn controls normally closed contact 88. Thus, if lamp 60 is to indicate the closed status of circuit breaker 66, the contact 88 is open when circuit breaker 66 is actuated so that SS1 relay coil 89 is not actuated thus causing contact 89-1 to remain normally closed as shown thereby applying power against lamp 60. For this particular set of circumstances, tripping of breaker 66 causes contacts 88 to close thus selecting relay 89 and opening contacts 89-1 while closing contacts 89-2 thereby switching actuation power to lamp 61. As is apparent from FIG. 4, lamps 60 and 61 are visible on the control file module front panel. Similarly, amber lamp 64 is energized whenever the select pushbutton 58 or 59 is actuated. Although not specifically illustrated in FIG. 5, it will be understood that pushbutton 59 can likewise control an operation function for a field device 11 similar to that shown and described for pushbutton 58.

Manually controlled switches 65 and 66 permit selection between the local and supervisory control modes. That is, the closing of any of these switches provides a connection via terminals 92-93 to the supervisory equipment so the specific functions involved can be selected by the supervisory equipment as well as locally. With these switches open, only local control is possible. The remote supervisory equipment is connected to terminals 90 and 91 to allow supervisory selection of the trip and close functions in function module 31. Note that blocking switches could be included in-line with 90 and 91 if desired to prevent any inadvertent confusion of the function selection when only local control is intended. Note also that the output of the transducer 78 and equivalent transducers for other measurements are directly connected to the supervisory equipment via the connections shown schematically at block 95 so that any of these measurements can be remotely selected and monitored at the supervisory equipment without disturbing the I/O equipment.

The alarm status monitoring modules such as might be included in row 35 of FIG. 2 typically include a series of indicator lamps associated with each of the items being monitored. FIG. 6A shows a typical circuit for monitoring the status of particular points such as power transformer oil level limits, winding hot spots, oil temperature limits, loss of circulation, loss of station battery charger, loss of power circuit breaker tripping power, violation of station security or the like. One such apparatus (not shown) controls the status of a contact point 100 which is normally open, while another monitoring apparatus controls normally closed contact 113. Thus the monitoring circuit 101 is shown for monitoring a normally open contact 100 whereas circuit 102 monitors a normally closed contact 113 meaning that these circuits provide an indicator switching upon loss of the normal status for contact 100 or 113. With jumper 96 connected as shown, contact 100 is monitored in the normally open state by circuit 101. Relay 103 will not be actuated and thus normally closed contact 103-1 will remain closed as shown so that current will be drawn through lamp 104 and diode 106 thus maintaining the base electrode for silicon controlled rectifier SCR device 108 out of conduction via the connection through resistor 107. Any fault which results in the closing of contact 100 will cause relay coil 103 to be selected thus opening normally closed contact 103-1 and removing the ground connection or negative connection from the base terminal of SCR 108 and further gating SCR 108 into conduction. This effects the actuation of alarm indicator lamp 109. The subsequent removal of the fault condition such that contact 103-1 again closes will not be effective to gate SCR 108 out of conduction so that both lamps 104 and 109 will be concurrently energized. The alarm indication requires positive attention such as actuation of normally closed reset manual pushbutton switch 110 in order to remove the alarm indication. Typically reset pushbutton 110 is the only operable element present on the front panel for an alarm status module other than the visual display lamps such as 104, 109, 111 and 112.

Note that normally closed monitoring circuits such as 102 operate effectively in a somewhat similar manner as circuit 101. For this case, jumper 97 is included and contact 113 is closed under normal conditions so that relay 114 is actuated. Thus contact 114-2 will be held closed. SCR 115 is gated into conduction with the loss of normally closed contact 113. Further, the conduction of SCR 115 will continue once established until removed by actuation of reset pushbutton 110. The supervisory equipment can likewise monitor the alarm status of each circuit such as 101 or 102. For instance, FIG. 6B shows a supervisory interconnecting circuit for circuit 101. Thus contacts 103-3 can be selected for monitoring a normally open contact 100 whereas 103-4 for monitoring a normally closed contact (assuming an appropriate shift of jumpter 96) by positioning switch 116 so as to couple the appropriate signal to output terminals 117 and 118. The particular circuitry shown for transmission to the supervisory equipment does not latch up in the presence of a failure or alarm condition as do circuits 101 and102.

FIGS. 7A and 7B arranged side by side as a composite (i.e.: 7A on the left and 7B on the right) provide a schematic diagram somewhat similar to FIG. 5 except that more complete arrangements of the various potential functions and controls are presented as well as the general modular configuration of the function control module such as 31 and a typical control function module such as 47. In order to simplify the description of FIG. 7 and to correlate it with the description of FIG. 5, common reference numerals have been employed between FIG. 5 and 7 wherever reasonable to do so. As with FIG. 5, FIG. 7 is illustrated by controlling only a single power circuit breaker via control coils 67. Further, the basic wiring is shown in FIG. 7 for a wide variety of potentially selectable control operations and the pairs of square terminals as shown L1–L28 are intended to indicate positions in which applicable jumper link connections can be included for selecting amongst these control functions. It will also be recognized that various elements such as relays and the like can be plug-in elements so that the basic configuration of a function and/or control module can be tailored to the particular substation to be controlled from a basic common circuit arrangement.

To illustrate the modularity, assume that the control file module 47 is to include only one pushbutton 58. In this case, pushbutton 59 is omitted entirely as is SA relay 71 and all of its associated contacts. Accordingly, link L20 is established by placing a jumper between terminals 120 and 121 and also between terminals 122–123 as well as 124–125 for completing links L16 and L15, respectively, in the lower portion of FIG. 7B. Still further, with terminals 126 and 127 jumpered to complete link L3 on the right side of FIG. 7A, the resulting combination is a single function control for control file module 47 which is substantially the same in operation as that previously described for FIG. 5 with the total omission of the elements associated with the pushbutton 59. In any event, the output power bus 74 is connected so as to provide the input power for the next control file module so that only one control file module can be actuated at a given time with the priority of such actuation being serially arranged. Note that additional relay contacts 84-5 and 86-5 are arranged so as to interlock between closing relay coil 86 and tripping relay coil 84 so that they cannot be inadvertently operated at the same time.

In some cases, the closure control circuitry 87 for a circuit breaker might be associated with a field device which requires an exceptional period of time for effecting the directed control operation. An example of such a function might be in the synchronous coupling between two powered lines. For synchronous switching applications, the actuation of the close contact 48 results in a selection of the circuitry controlling the switching of a signal to 87 thus initiating automatic synchronous switching by the field device (not shown). The synchronous switching control under these circumstances is powered by the potential at either terminal 134N for actuation of narrow band switching or terminal 134W for wide band depending upon the state of wide select relay 130 and thus contacts 130-1 and 130-2. That is, closure of select switch 58 energizes select relay 70 thereby closing normally open contacts 70-5. With link L23 connected, this effects coupling of a circuit from negative 24 volt line 148 through closed contact 88, the A relay 140 coil to the IC SELECT line. Thus concurrent actuation of close switch 48 applies positive 24 volts to this circuit thereby actuating relay 140 and closure of contacts 140-1 and 140-2 so as to hold A relay 140 and S relay 70 energized via the interlock +24 volt line connection through N/C reset contact 138-1. Further, the +24 volts is coupled via contacts 140-5 to the A BUS. This powers the synchronizer controls which are connected to terminal 134N via N/C 130-1 or terminal 134W if wide select switch 51 is actuated to effect closure of contacts 130-2. That is, the synchronous switch control responds to 130-1 closure by attempting to energize close coil 87 on narrow band phase difference exclusively and will permit wide band switching only if contact 130-2 is closed so that power is present at terminal 134W. The actual closure will not occur until the potential on the running and incoming busses are each within the narrow band as long as wide select switch 51 is not actuated. This effects closure of contacts 128 so that +24 volts is transferred to the CSS BUS through now closed contact 140-6 to the IC COIL line and thence to IC relay coil 86. At that point, contacts 86-1 through 86-4 close placing +125 volts on the 125 CLOSE bus thus powering close coil 87 via contacts 70-4 and completed link L16.

If switching cannot be effected on narrow band but the circumstances permit, the wide synchronization switch 51 can be closed thus selecting relay 130. This opens the narrow synchronization contacts 130-1 and closes the normally open contacts 130-2 thereby directing the synchronous switching controls to energize close coil 87 to effect switching on a greater phase difference between the incoming bus 131 and the running bus 132 as is reflected by closure of contacts 129. Further, contact 130-3 is closed thereby maintaining potential across timer relay 130 as well as placing potential against display lamp 52. This latches relay 130 until such time as the synchronization control circuitry for closing control of 87 effects switching at which point contacts 88 associated with the field device 67 are opened thus dropping relays 70, 86, 89, 130 and 140 as well as lamps 52, 57 and 64. If the switching is not effected within a predetermined time period established by timer circuit 136, it will actuate relay 135 and close contacts 135-1 thus actuating an audible alert system 137. Thereafter reset button 50 must be actuated so as to energize reset relay 138 opening contacts 138-1 and 138-2 so as to inform the remote supervisor that a reset has occurred. Note further that actuation of relay 130 will open normally closed contacts 130-4 signaling to the supervisory equipment that a wide synchronous switching is in effect.

Briefly reviewing the synchronous switching operation performed when pushbutton 58 is actuated selecting relay 70, the presence of a jumper placed to complete link L23 between terminals 141 and 142 in conjunction with the closing of normally open contact 70-5 provides a completed power circuit to select relay 140 at the time that close pushbutton 48 is concurrently actuated. As a result, contact 140-1 will close thus latching relay 140 until either an open contact condition is presented at 88 indicating that the switching has been effected or the reset relay 138 is actuated so as to open normally closed contact 138-1. Note further that contact 140-2 closes so as to insure continued selection of relay 70 until the aforementioned conditions occur. The closing of relay 140 further closes normally open contacts 140-3 and 140-4 shown at the bottom of FIG. 7A thus placing the incoming bus 131 and running bus 132 potentials on the synchronizer circuitry and also coupling those potentials via appropriate transducers to two of the voltmeters shown on display panel 40. Still further, relay contact 140-5 is closed so as to insure that continued energization is applied to the synchronizer circuitry which then directly controls closing relay 86 until reset or actual switching occurs.

Sensing terminal 145 which is connected to the supervisory equipment is coupled via diode 146 through one side of switches 53 and 54 and return loop 147 through one side of switches 65 and 66 to common bus 148 with contact 130-4 and terminal 149 providing supervisory, sensing for wide sync. Accordingly light emitting diode 55 is only lit when all of switches 53, 54, 65 and 66 are in the supervisory or closed position. Further, the supervisory equipment can detect the absence of supervisory connections by the absence of a closed circuit between terminals 144 and 145 via diode 146. The supervisory equipment can remotely control all of the same operations as the modules including close, trip, reset, wide and selection of both operations in the control module via terminals 150-153, 171 and 172 if the L/S switches are appropriately set in the "S" state.

Some power circuit breakers include apparatus for performing a recloser operation wherein tripping of the circuit breaker is followed by a brief waiting period after which the circuit breaker is automatically reclosed. One of the options available in the modular arrangement illustrated in FIG. 7 includes circuitry for selectively preventing this reclosure operation. For this purpose, recloser blocking (RB) relay coil 155 is arranged to be selected by contact 70-6 of selector relay 70 whenever a tripping operation is to be performed. Thus when contact 70-6 is closed, the set input 156 for relay 155 is selected. Under these circumstances, a jumper is normally placed to complete link L26 between terminals 158 and 159 (lower portion of FIG. 7B) and, assuming manual blocking switch 67 is closed, the recloser apparatus normally would attempt to reclose the power circuit breaker via control coils 67 by closing relay contact 160. However, with the RB relay 155 set, normally closed contact 155-1 will be open thus preventing an attempt to reclose the circuit breaker by the automatic recloser apparatus. Conversely, when the circuit breaker is to be closed, it may be desirable to include a link L18 jumper between terminals 161 and 162 so that the contact 70-7 will introduce a reset signal at input 157 to relay 155 to insure that contact 155-1 is closed to restore the reclosing relay to service. The actuating potential for reset input 157 is obtained via the interconnection of the ICR BUS, close switch 48 and bus 72.

Note further that link L7 jumpers between terminals 163 and 164 permit the coupling of relay contact 155-2 so as to hold the SS1 indicator coil 89 in the latched condition so as to maintain the appropriate actuation of lamps 60 and 61. Similar jumpers L19 and L25 can be included for operations in response to actuation of secondary selector coil 71 so as to couple its contacts 71-5 and/or 71-6 in circuit with the set input 156 and rest input 157 respectively for recloser blocking relay 155. A secondary display controlling relay (SS2) 165 controls the selection of lamps display 62 and 63 in response to actuation of the secondary selector button 59 and its associated relay (SA) 71 with appropriate inclusion of jumpers. Further, contacts 166 are included for tripping the power circuit breaker by actuating trip control coil 85 in the presence of an overload condition or the like by well known circuitry. Terminals such as 167-170 are included for the purpose of providing supervisory status input so that the supervisory equipment can monitor the various states of the circuitry, appropriate jumpers being included where needed to effect this coupling.

Reviewing briefly, the A relay 140 is used with a synchronized circuit breaker to apply the incoming and running potentials to the appropriate displays and control circuitry, to connect the synchronized switching control equipment (CSS) and to seal in the associated relays and alarm timer until the power circuit breaker is closed or the circuitry is reset. The analog file such as those contained in rows 36-38 of FIG. 2 contain cards for handling various analog values as appropriate while the control files contain the cards for the particular types of controls and status to be effected. The close function (IC) relay 86 provides not only the function of power circuit breaker closing but also can be employed for automatic transformer tap changing control and/or tap raising functions. Conversely, the trip function (IT) relay 84, in addition to providing the described power circuit breaker tripping function, can provide selection of manual transformer tap changing operation. As mentioned, the recloser blocking or RB latched relay 155 provides recloser blocking or transformer automanual service. The RC contact points 160 are the input from the recloser relay but can also be the transformer automatic control operation. The reset contact 50 is included to reset or effectively cancel any previously activated synchronized power circuit breaker operation. The select relays 70 and 71 provide the dual selection capability either manually or under supervisory control. The alarm status file 35 can contain a multiplicity of alarm detecting modules as discussed previously and can also include a card for an alarm status reset button. The SS1 relay 89 and the SS2 relay 165 provide status for panel lamp controls associated with pushbuttons 58 and 59 respectively and can also be coupled to provide supervisory input indications. The timer relay 135 operates the audio alert or sonalert whenever a synchronized point has been in operation for an extended period of time (such as three minutes) and has been unsuccessful in closing the power circuit breaker. This condition is cleared by operating the reset function relay 138 to disconnect all relays associated at this point. If not reset, this alarm will continue until the power circuit breaker closes or is reset.

The X relay 130 provides control of the synchronizing band width. All power circuit breakers initially called up are set for narrow band synchronizing. Operation of relay 130 by selection of the wide functional pushbutton 51 changes this synchronization to wide band. Upon successful closing of the breaker or operation of the reset function pushbutton 50, the synchronizer automatically restores to narrow band synchronizing. A green lamp 52 is illuminated when wide band synchronizing is selected. As is general practice in the power utility industry, the red lamp generally indicates a normal function and a green lamp indicates an abnormal operation.

Note that in a typical installation the synchronizer switching relay and associated phase angle transducer would be included within the housing of cabinet 30 and not be a specific element on any of the modules. The circuitry as described is recognized as a two-step operation which requires a first step of selection and a second step of performing the function. The selection step entails selection of the proper device to be operated as to its system designation such as breaker number, bank number and the like. The proper control panel or control module displaying the desired system is then selected and the pushbutton such as 58 or 59 depressed. Operation of these pushbuttons 58 or 59 permits reading analog values on the digital panel meter 40 if no other operation or switch button is selected. When the device is in the open or tripped state, the digital panel meter will read random values or zero value. However, with the device in the closed state only, the analogs which are associated with the selected point are displayed on panel 40.

The arrangement of the power lines for the modules insures that only one select pushbutton can be operated at a time to provide control or meter readout. Any select button that is operated at a point between another select button and main bus 72 results in the automatic release of the downstream button. For instance, if a circuit breaker has been selected and placed in synchronous switching operation wherein it is latched and has not closed successfully or been reset, operation of a control file module located closer to bus 72 has the effect of releasing the lower synchronization. In a typical arrangement, the priority will be from left to right as between the control file modules. As described, devices which require synchronizing upon operating the close function pushbutton and the appropriate select pushbutton need not be held in the depressed position until the device is closed. The components internally retain this selection until the completion of the closing cycle or the audible alarm is heard which generally requires operation of the reset button. Note that shifting between narrow and wide synchronizing by actuation of switch 51 does not require any concurrent or additional pushbutton selections.

The close function relay 86 typically can be used to provide automatic closing of a circuit breaker, automatic operation of an automatic throw-over scheme, automatic operation of separate recloser blocking, and raise operations for a transformer bank tap. The trip function relay 84 can be assigned tasks such as control of the circuit breaker tripping, manual operation for a transformer bank, non-automatic operation for a separate recloser blocking and lowering operation for a transformer bank tap.

The control file modules can be used merely for monitoring field devices if desired without including control operations. Further, a wide variety of field devices can be controlled such as circuit switchers, motor operated gang switches, and the like in addition to the various operations mentioned previously. Further, the recloser blocking relay 155 can be used to block low side bus tie breaker circuitry when this low side bank power circuit breaker is tripped locally or by supervisory during system load conservation conditions. In tap changing, operation of the close function pushbutton 48 effects raising the tap control by a single step whereas the operation of the trip function pushbutton 49 effects lowering by a single step in a typical operation. When associated with a tap control transformer, operation of a select pushbutton only will provide a tap position digital display and a display of the three-phase voltage analog values.

Terminal 194 (lower left corner of FIG. 7B) is included to permit an additional monitor or control interface to the field device. For instance, link L27 permits monitoring via display lamp 195 as might be the case for a double trip coil circuit breaker. Completion of link L28 permits switching of 125 volts as a control to terminal 194.

FIG. 8 illustrates an arrangement for multiplexing the various measurements produced by transducers such as 78 into the appropriate display on panel 40. The output of transducer 78 is connected across a divider circuit 83 which provides a scaling function and is composed of serially connected variable and fixed resistors. Actuation of a selector pushbutton such as 58 or 59 (note FIGS. 5 or 7) will result in power being applied to input lines 175 and 176 for selecting the actuation coil of relay 75. Additional relays are actuated via lines 177 and 178 as needed. Thus FIG. 8 illustrates all circuitry required for actuating the entire display panel although the description will relate only to the selection of relay 75. Outputs 180 are appropriately connected to the power source relays for energizing the digital displays on panel meter 40.

The output contacts from relay 75 are connected to groupings of jumper terminals 181–186. Thus, considered from left to right, the three output terminals associated with group 181 might represent the positive side of either the first or A phase amperes, first phase voltage or megawatt measurements. The negative jumpers for these measurements are contained in the same order at group 184 and thus connected to the selected output such as either the A phase amperage to display 42, A phase voltage to display 41 or the megawatt display to meter 43. The sequence for grouping 182 can represent the positive selection of the B-phase amperage, B-phase voltage or megavars with the negative complement connections being contained in grouping 185. Finally, group 183 includes the positive side of the C-phase amperage or voltage or the positive of the tap position indicator with grouping 186 corresponding to the complement. As mentioned previously, the specific display devices contained on panel 40 include appropriate analog to digital conversion circuitry for producing a readable digital display from the values measured by the transducers such as 78, 188 and 190.

The display multiplexing arrangement illustrated in FIG. 8 is particularly well suited for handling three-phase systems. Thus, the transducers 78, 188 and 190 which are coupled into relay 75 can be employed to measure and display the current of each of the three phases. By using two additional relay systems similar to that shown in FIG. 8, the pertinent measurable parameters for an entire three-phase switching system can be measured and displayed. However, the system is equally applicable for single phase systems. Still further, when a synchronized switching operation is to be performed, only one display relay is selected and this display arranged to provide signals indicating the voltage of the incoming bus, the voltage of the running bus and the phase angle difference with the latter measurement being directly coupled to display 45.

Reviewing, each substation controlling I/O cabinet will include one function module which itself includes and X, RST, IC and IT relay. Each analog card associated with an analog module typically contains three K relays. The status modules as illustrated in FIG. 6 will contain as many status relays 103 or 114 as needed. In the preferred embodiment as shown and described, all relays within the I/O cabinet are operated by 24 volts whereas the field devices are assumed to be operable by 125 volts although the invention is not limited to those values. The following is a brief description of a plurality of potentially standard control module cards which can provide the function controls in association with the function module as discussed:

Type 1: The function performed is control of a power circuit breaker provided with select pushbutton 58. Synchronizing is employed for closing and recloser blocking is included wherein tripping of the breaker prevents reclosing and closing of the breaker provides reclosing. Operation of the blocking toggle switch 67 prevents reclosing conditions without tripping the breaker. Type 1 modules include an S, A, SS1 and RB relay. For application of higher voltage (e.g.: 125 volts) to the display lamps, the links connected by jumpers include L2, L12, L15–L18, L20, L23, L26 and L27. For display lamp actuation via lower voltage such as 24 volt, the type 1 card includes links L2, L3, L12, L15, L16, L18, L20, L23 and L26.

Type 1/5: For this type control, power circuit operation is provided with the selection of pushbutton 58 and synchronization of closing is obtained. Recloser blocking is included to prevent reclosing when the breaker is tripped but to provide reclosing when it is closed. To reset the recloser blocking to the automatic state after successful breaker closing, the second selection pushbutton 59 is operated as mentioned below. The second selection pushbutton 59 provides separate recloser blocking when the trip function is performed with pushbutton 59 selected. Further, operating the close function pushbutton 48 will provide recloser operation. Recloser blocking or recloser operation is obtained through operation of pushbutton 59 without tripping the breaker. Type 1/5 cards each include an S, SA, A, SS1, SS2 and RB relay. For high voltage (125v) display control, the links established are L2, L4, L5, L8, L11, L12, L15–L17, L19, L23 and L25–27. For low voltage connections are established for L2–L5, L8, L11, L12, L15, L16, L19, L23, L25 and L26.

Type 2: Power circuit breaker operation is provided with selection of pushbutton 58 but without synchronizing. Each of these type cards includes an S, SS1 and RB relay. The links established for high voltage lamp display include L2, L12, L15–L18, L20, L24, L26 and L27. Low voltage linkages are L2, L3, L12, L15, L16, L18, L20, L24 and L26.

Type 2/5: Two circuit breaker operations are provided with selection of pushbuttons 58 or 59 without synchronizing. This module card is otherwise identical with Type 1/5. Each card includes an S, SA, SS1, SS2 and RB relay. For high voltage the linkages established are L2, L4, L5, L8, L11, L12, L15-L17, L19 and L24-L27. For low voltage the linkages are L2-L5, L8, L11, L12, L15, L16, L19 and L24-L26.

Type 3: Selection of pushbutton 58 performs control of unsynchronized circuit breaker operation (without recloser blocks), circuit switcher control, motor operated gang switch control or the like. Only close and trip functions can be employed. The card includes an S and SS1 relay. The linkages established are L2, L3, L12, L15, L16, L20 and L24.

Type 6: Power circuit breaker operation is obtained by operation of pushbutton 58 but the breaker is a transformer bank low-side breaker with no synchronizing and no recloser blocking. Recloser blocking relay RB, although included, is used to block the low side bus tie breaker when this low-side bank breaker is tripped locally or by supervisory during system load conservation conditions. Otherwise only the basic close and trip functions are employed. This card includes an S, SS1 and RB relay. The links established include L2, L3, L12, L15, L16, L18, L20, L24 and L28.

Type 10/11: This card is used for transformer tap change control provided in conjunction with the selection of pushbutton 58. Operation of the close function pushbutton on the function module operates internal latching relays to the automatic position which is indicated by a red lamp status indicator. In this state, transformer tap changing is in the automatic operating condition. Operation of the trip function pushbutton will operate internal latching relays to the manual position which is indicated by a green lamp status indication. Selection of pushbutton 59 permits operating the close function pushbutton to raise the tap control in one step increments whereas operating the trip function pushbutton operates to lower the tap control in one step increments. Operation of select pushbutton 59 only will provide tap position and three-phase voltage analog value displays. The module includes an S, SA, SS1 and RB relay with the linkages being L2, L3, L6, L7, L12, L18, L21, L22, L24 and L28.

Type 16: This module is included when only the monitoring of potential analog values via pushbutton operation is desired. This module is contemplated as including up to six pushbuttons which can be actuated to display the three-phase voltage analog values. It includes no relays and the linkage connections are only L20 and L27.

Although not specifically mentioned for any of the foregoing exemplary function modules, links L9 and L13 can be connected whenever a particular supervisory remote requires that the status input must use positive potential instead of negative. Further links L1 and L10 are used when SS1 relay 89 and SS2 relay 165 are energized to obtain the normal state status for a red lamp. Relay 89 is then monitored by a power circuit breaker "52a" contact instead of a "52b" contact 88. Relay 165 can be accommodated by the same "52a" contact via links L5 and L7 or via link L5 and normally open contact 155-2 of RB relay 155.

The measurement of tap position for a tap changing transformer is generally effected by a center tap potentiometer with the position of the center tap being controlled by the tap changing mechanism at the transformer. Thus the tap position can be read as a DC voltage either directly from the center tap or as a balance bridge measurement. Such transducers are well known in the industry.

Although the present invention has been described with particularity to the foregoing exemplary preferred embodiment, various changes, modifications, additions and applications will be readily understood by those having normal skill in the art without departing from the spirit of this invention.

What is claimed is:

1. Apparatus for selectably actuating one or more of a plurality of subsets of devices comprising:
   a function module including a source of electrical power, an enabling signal output terminal, switching means for producing an output signal, and
   a plurality of control modules each including linking circuit means having normally coupled input and output terminals adapted for connection in serial circuit relation with other said control module linking circuit means and said function modules enabling signal output terminal, each said control module further having means selectably actuable in the presence of said enabling signal at said input terminal, power diversion means responsive to operation of said selectably actuable means for disconnecting said linking circuit means output terminal from said input terminal, said power diversion means including means for connecting said electrical power source to a respective subset of the plurality of devices, whereby operation of said selectably actuable means disables any other said control module having said linking circuit means thereof coupled downstream in said serial circuit relation from said function module enabling signal output terminal.

2. Apparatus in accordance with claim 1 wherein said linking circuit means each includes interruptible contact means, said apparatus further includes means interconnecting said contact means in serial relation from an origin point including said enabling signal output terminal for permitting a said control module to selectably disable the said control modules connected further from the origin point.

3. Apparatus in accordance with claim 2 which further includes a source of operating power for said control means, and means for coupling said source to said origin point whereby any said control module can selectably disable any other said control modules which are serially connected by said interconnecting means in a location further from said origin point.

4. Apparatus in accordance with claim 1 wherein said function module includes a plurality of said electrical power sources each responsive to the operation of a respective said switching means, each said control module including sufficient said connecting means for connecting to the associated device subset the said function module electrical power source required for controlling the associated device subset.

5. Apparatus in accordance with claim 4 for use with one or more of the device subsets which have transducers associated therewith for producing measurement indicating signals, said apparatus further including display means and said control modules each including means responsive to the concurrence of operation of the associated said selectably actuable means and the absence of disabling from another said contact module for connecting the indicating signals produced by the transducers of the device subset associated therewith.

6. Apparatus in accordance with claim 1 wherein one or more of the device subsets include detectors for providing signals indicative of completed control operations thereof, said control modules further including visual display means, and means for enabling said visual display means for indicating that the associated completed control operation indicative signal has occured.

7. Apparatus in accordance with claim 1 for use in conjunction with supervising equipment capable of producing command signals and a plurality of selection signals, said apparatus further including first means coupling said function module to the supervisory equipment command signals for actuation of said output signal producing means thereby and second means coupling the plurality of supervisory equipment selection signals to said connecting means of respective said control modules, whereby control of device subsets is available to the supervisory equipment or directly from said modules.

8. Apparatus in accordance with claim 7 which further includes means for selectably blocking said first and second coupling means so that control of the device subsets can be provided by said modules exclusively.

9. In a system for controlling and/or monitoring a plurality of subsets of devices from a function module which selectably produces a plurality of control signals of a sufficient number to control operation of all of the devices with the system further including an operating power source and a plurality of display devices and measurement signal producing transducers in conjunction with the devices, a plurality of control modules associated with respective subsets of the devices and each comprising:
  switch means,
    means responsive to operation of said switch means for connecting at least one of the function module control signals to the subset of devices associated with said control module, and
  means serially connectable with the operating power source and other control modules for disabling said connecting means in response to operation of said switch means in another of the control modules connected in serial upstream relation to the operating power source.

10. Apparatus in accordance with claim 9 wherein said control module further includes means responsive to operation of said switch means and the absence of disabling from another said control module for coupling the measurement signals from the transducers of the device subset associated with said control module to appropriate display devices.

11. In a system in accordance with claim 9 which has circuit means for serially interconnecting said control modules from the operating power source, said disabling means for each said control module including input and output terminals for coupling in line with the serial interconnecting circuit means and interruptible contacts connected in series between said input and output terminals, said disabling means including means for opening said interruptible contacts in response to operation of said switch means, whereby actuation of said switch means in any said control module will remove operating power from any other said control module connected in the serial interconnection circuit means at a point more remote from the operating power source.

12. In a system in accordance with claim 11 wherein at least one of said control modules includes a plurality of groups of control elements with each said group including a said switching means, a said connecting means and a said disabling means, said control module further including a plurality of said interruptible contacts arranged for serially interconnecting said groups between said input and output terminals and being responsive to operation of a respective said switch means for interrupting operating power from all said groups located in the serial interconnection further from said input terminal.

13. In a system in accordance with claim 11 for use in conjunction with supervisory equipment which produces selection signals, each said control module including means receiving the supervisory equipment selection signals for effecting the operation of said switch means in response thereto.

14. A system for controlling a plurality of subsets of field devices comprising:
  a function module including a plurality of switching means, a plurality of output terminals and a plurality of control signal producing means responsive to operation of respective said switching means for providing output control signals at respective said output terminals,
  a source of operating power,
  a plurality of control modules associated with respective subsets of field devices and each including an input terminal, an output terminal, a selection switch means, means responsive to operation of said selection switch means for connecting the field device of the associated subset to the said function module output terminals required for operation thereof, normally closed contacts coupled between said input and output terminals, and means responsive to operation of said selection switch means for causing said contacts to open, said connecting means and said disabling means being connected for receiving operating power from said control module input terminal, and
  means for interconnecting said control module input and output terminals in serial relation from said operating power source whereby operation of said selection switch means in any one of said control modules effects removal of operating power from all other said control modules located in the serial interconnection further from said operating power source so that said one of said control modules can control its associated subset of devices to the exclusion of said all other of said control modules.

15. A system in accordance with claim 14 wherein at least one of said control modules is associated with a subset of field devices which requires an exceptional period of time for effecting the directed control operation but which produces an output signal indicative of successful conclusion of the directed control operation, said at least one of said control modules further including means responsive to concurrence of actuation of said selection switch means and the said function module switching means which produces the control signal for initiating the control operation of the exceptional subset of field devices for maintaining actuation of said disabling means until occurrence of the successful conclusion indicating signal.

16. A system in accordance with claim 15 wherein said function module switching means includes reset switch means for selectably removing said operating power source from said serial interconnecting means whereby control operation of an actuated exceptional subset of field devices can be terminated prior to successful conclusion of the subset control operation.

17. A system in accordance with claim 16 wherein said function module further includes timer circuit means responsive to production of an exceptional subset control signal at a said function module output signal for providing a warning signal a predetermined time period thereafter, said timer circuit means being disabled by the occurrence of the successful conclusion indicating signal or the operation of said reset switch means.

18. A system in accordance with claim 15 wherein the exceptional period requiring subset of field devices includes an automatic synchronous AC power line connector which normally effects line switching within a narrow band of phase difference between the lines but which can be selectably enabled to effect switching between the lines within a wider band of phase difference, the associated said control module being arranged in conjunction with said function module for normally enabling narrow band switching by the device subset, said function module switching means including override switch means for selectably producing a control signal at an output terminal thereof for causing the device subset to revert to wide band switching.

19. In a system in accordance with claim 14 wherein at least some of the subsets of field devices include transducers for producing signals correlated to measurement of the operating conditions thereof, said system further including a plurality of display devices, each of said control modules associated with one of the transducer containing device subsets further including means responsive to the concurrence within the associated said control module of operating power at the said input terminal and operation of the said selective switch means for coupling the transducer produced measurement signals to appropriate ones of said display devices.

20. A system in accordance with claim 14 wherein at least one of said control modules includes a plurality of said normally closed contacts and a plurality of groups of control elements each including a selection switch means, a said connecting means and a said contact opening means, a first of said groups being directly coupled for receiving operating power from said control module input terminal, said plurality of contacts being connected in serial relation between the said input and output terminals of the associated said control modules for sequentially coupling operating power to said groups other than said first group, the said contact opening means of said groups being connected for opening respective said contacts, whereby operation of a said selection switch means in any of said groups removes operating power from any other said group connected to said serial contact connection at a point further from the said input terminal than the selected said group and concurrently removes operating power from any said control module in the series interconnection from the said output terminal of said one of said control modules.

21. A system in accordance with claim 14 operable in conjunction with supervisory equipment capable of selectably producing a plurality of selection signals and command signals which further includes means for connecting the plurality of selection signals to respective said control modules for effecting responses thereto equivalent to operation of said function module switching means.

22. A system in accordance with claim 21 wherein said connecting means further includes a plurality of blocking switches for preventing connection of selected selection signals and command signals to said modules, whereby control of the subsets of field devices can be effected by said modules exclusively or by either said modules or the supervisory equipment.

* * * * *